(12) United States Patent
Wu et al.

(10) Patent No.: US 9,491,667 B2
(45) Date of Patent: Nov. 8, 2016

(54) METHOD AND DEVICE FOR HANDOVER TO SERVING NETWORK

(71) Applicant: Huawei Technologies Co., Ltd., Shenzhen, Guangdong (CN)

(72) Inventors: Xiaobo Wu, Shanghai (CN); Hai Liu, Shanghai (CN); Wenruo Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 14/201,030

(22) Filed: Mar. 7, 2014

(65) Prior Publication Data
US 2014/0185586 A1 Jul. 3, 2014

Related U.S. Application Data

(63) Continuation of application No. PCT/CN2012/081189, filed on Sep. 10, 2012.

(30) Foreign Application Priority Data

Sep. 8, 2011 (CN) .......................... 2011 1 0265431

(51) Int. Cl.
*H04W 4/00* (2009.01)
*H04W 36/00* (2009.01)

(52) U.S. Cl.
CPC ................ *H04W 36/0022* (2013.01)

(58) Field of Classification Search
CPC ............................................. H04W 36/0022
See application file for complete search history.

(56) References Cited

U.S. PATENT DOCUMENTS

2009/0238159 A1* 9/2009 Takano ................ H04L 45/124
                                                                370/338
2013/0010752 A1* 1/2013 Rydnell et al. ............... 370/331

FOREIGN PATENT DOCUMENTS

CN          101466122 A         6/2009
CN          101472220 A         7/2009
                    (Continued)

OTHER PUBLICATIONS

"rSRVCC alternative #3: solution proposal for how the MSC finds the source PS node," 3GPP TSG SA WG2 Meeting #83, Salt Lake City, Utah, USA, S2-110591, 3$^{rd}$ Generation Partnership Project, Valbonne, France (Feb. 21-25, 2011).

(Continued)

*Primary Examiner* — Huy D Vu
*Assistant Examiner* — Kevin Cunningham
(74) *Attorney, Agent, or Firm* — Leydig, Voit & Mayer, Ltd.

(57) ABSTRACT

The present invention discloses a method and a device for handover to a serving network. The method includes: receiving a first Handover Request sent by a BSC/RNC; sending a second Handover Request to a target MME according to the first Handover Request, where the second Handover Request includes an IMSI and first information for determining a source SGSN so that the MME sends a Context Request message including the IMSI to the source SGSN and receives context information of a UE that corresponds to the IMSI and is sent by the source SGSN. Thereby avoiding a handover failure which is caused because the MSC server and the SGSN select different MMEs, and further synchronizing PS and CS handover processes, improving handover accuracy and efficiency, and enhancing user experience.

11 Claims, 13 Drawing Sheets

(56) References Cited

FOREIGN PATENT DOCUMENTS

| CN | 101472306 A | 7/2009 |
|---|---|---|
| EP | 2224640 A1 | 9/2010 |
| JP | 2014522151 A | 8/2014 |
| WO | WO 2010051873 A1 | 5/2010 |
| WO | WO 2010122029 A1 | 10/2010 |

OTHER PUBLICATIONS

"3$^{rd}$ Generation Partnership Project; Technical Specification Group Services and System Aspects; Single Radio Voice Call Continuity (SRVCC); Stage 2 (Release 11)," 3GPP TS 23.216, V11.2.0, pp. 1-53, 3$^{rd}$ Generation Partnership Project, Valbonne, France (Sep. 2011).

"3$^{rd}$ Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 10)," 3GPP TR 23.885, V1.4.0, pp. 39-42, 3$^{rd}$ Generation Partnership Project, Valbonne, France (Jul. 2011).

"3$^{rd}$ Generation Partnership Project; Technical Specification Group Services and System Aspects; Single Radio Voice Call Continuity (SRVCC); Stage 2 (Release 11)," 3GPP TS 23.216, Version 11.1.0, 3$^{rd}$ Generation Partnership Project, Valbonne, France (Jun. 2011).

"Bearer release handling in the source MME/SGSN," SA WG2, Meeting #82, Vancouver, Canada, xS2-121013, 3$^{rd}$ Generation Partnership Project, Valbonne, France (Feb. 6-10, 2011).

\* cited by examiner

METHOD AND DEVICE FOR HANDOVER TO SERVING NETWORK

CROSS-REFERENCE TO RELATED APPLICATIONS

This application is a continuation of International Patent Application No. PCT/CN2012/081189, filed on Sep. 10, 2012, which claims priority to Chinese Patent Application No. 201110265431.7, filed on Sep. 8, 2011, both of which are hereby incorporated by reference in their entireties.

FIELD OF THE INVENTION

The present invention relates to the communications field, and in particular, to a method and a device for handover to a serving network in the communications field, where the device includes a mobile switching center (MSC) server, a serving General Packet Radio Service (GPRS) support node SGSN, a target mobility management entity (MME), and a base station controller BSC/radio network controller RNC.

BACKGROUND OF THE INVENTION

A second-generation mobile communication technology (2nd Generation, 2G) or a 3rd-generation mobile communication technology (3rd Generation, 3G) network has created an overall coverage situation after being deployed for many years. Meanwhile, with the development of network technologies, some PS domain networks providing only a packet switched (PS) domain, such as a long term evolution (LTE) network, in an early stage of network construction, has gradually covered some city areas and telephone traffic hotspot areas. Therefore, in current communication networks, the PS domain networks coexist with 2G/3G networks.

Corresponding to different communication networks, different bearing mechanisms are available for voice services. Specifically, in a 2G/3G network, a voice call supports a session service borne by a circuit switched (CS) domain, while in a PS domain network, a voice call supports a session service borne by a PS, which is also referred to as a voice over Internet Protocol (VoIP) service, for which an IP multimedia subsystem (IMS) ensures the quality of service.

A technical solution is desired for enabling an MSC server and an SGSN to interact with the same MME, thereby switching a voice service from a CS domain of a global system for mobile communications (Global System of Mobile Communication, GSM)/universal mobile telecommunications (Universal Mobile Telecommunications System, UMTS) network, which is specifically a GSM/UMTS network, to a PS domain of an LTE/high speed uplink packet access (High Speed Uplink Packet Access, HSPA) network.

SUMMARY OF THE INVENTION

Embodiments of the present invention provide a method for handover to a serving network, an MSC server, an SGSN, an MME, and a BSC/RNC, thereby enabling the MSC server and the SGSN to interact with the same MME and switching a voice service from a CS domain to a PS domain.

In one aspect, the present invention provides a method for handover to a serving network, where the method includes: receiving a first Handover Request sent by a base station controller BSC/radio network controller RNC; and sending a second handover request to a target mobility management entity MME according to the first Handover Request, where the second Handover Request includes an international mobile subscriber identity IMSI and first information for determining a source SGSN, so that the target MME sends a Context Request message including the IMSI to the source SGSN and receives context information of a user equipment (UE) corresponding to the IMSI sent by the source SGSN.

In another aspect, the present invention provides a method for handover to a serving network, where the method includes: receiving a Context Request message sent by a target mobility management entity MME, where the Context Request message includes an international mobile subscriber identity IMSI, the Context Request message is a message sent by the target MME according to a Handover Request from a MSC server, and the Handover Request includes the IMSI and first information for determining a source SGSN; and sending a Context Response message to the target MME according to the Context Request message, where the Context Response message includes context information of a user equipment corresponding to the IMSI.

In another aspect, the present invention provides a method for handover to a serving network, where the method includes: receiving a second Handover Request sent by a MSC server, where the second Handover Request includes an international mobile subscriber identity IMSI and first information for determining a source SGSN, and the second Handover Request is a request sent by the MSC server according to a first Handover Request from a base station controller BSC/radio network controller RNC; determining the source SGSN according to the first information; sending a Context Request message including the IMSI to the source SGSN; and receiving a Context Response message sent by the source SGSN, where the Context Response message includes context information of a user equipment corresponding to the IMSI.

In another aspect, the present invention provides a method for handover to a serving network, where the method includes: receiving a CS Handover Required message sent by a base station controller BSC/radio network controller RNC; sending a CS to PS Handover Request message to a target mobility management entity MME according to the CS Handover Required message; sending a CS Handover Required Acknowledgement message to the BSC/RNC according to the CS Handover Required message, where the CS Handover Required Acknowledgement message includes second information for determining the target MME so that the BSC/RNC sends a PS Handover Required message including the second information to a SGSN, thereby enabling the source SGSN to send a Relocation Request message to the target MME.

In another aspect, the present invention provides a method for handover to a serving network, where the method includes: receiving a PS Handover Required message sent by a base station controller BSC/radio network controller RNC; sending a Relocation Request message to a target mobility management entity MME according to the PS Handover Required message; sending a PS Handover Required Acknowledgement message to the BSC/RNC according to the PS Handover Required message, where the PS Handover Required Acknowledgement message includes second information for determining the target MME so that the BSC/RNC sends a CS Handover Required message including the second information to a mobile switching center MSC server, thereby enabling the MSC server to send a CS to PS Handover Request message to the target MME.

In another aspect, the present invention provides a mobile switching center MSC server, where the MSC server includes: a first receiving module, configured to receive a first Handover Request sent by a base station controller BSC/radio network controller RNC; and a sending module, configured to send a second Handover Request to a target mobility management entity MME according to the first Handover Request received by the first receiving module, where the second Handover Request includes an international mobile subscriber identity IMSI and first information for determining a SGSN, so that the target MME sends a Context Request message including the IMSI to the source SGSN and receives context information of a UE which corresponds to the IMSI and is sent by the source SGSN.

In another aspect, the present invention provides a SGSN, where the SGSN includes: a first receiving module, configured to receive a Context Request message sent by a target mobility management entity MME, where the Context Request message includes an international mobile subscriber identity IMSI, the Context Request message is a message sent by the target MME according to a Handover Request from a MSC server, and the Handover Request includes the IMSI and first information for determining the SGSN; and a sending module, configured to send a Context Response message to the target MME according to the Context Request message received by the first receiving module, where the Context Response message includes context information of a user equipment corresponding to the IMSI.

In another aspect, the present invention provides a mobility management entity MME, where the MME includes: a first receiving module, configured to receive a second Handover Request sent by a MSC server, where the second Handover Request includes an international mobile subscriber identity IMSI and first information for determining a source SGSN, and the second Handover Request is a request sent by the MSC server according to a first Handover Request from a base station controller BSC/radio network controller RNC; a determining module, configured to determine the source SGSN according to the first information included in the second Handover Request received by the first receiving module; a first sending module, configured to send a Context Request message including the IMSI to the source SGSN determined by the determining module; and a second receiving module, configured to receive a Context Response message sent by the source SGSN, where the Context Response message includes context information of a user equipment corresponding to the IMSI.

In another aspect, the present invention provides a base station controller BSC/radio network controller RNC, where the BSC/RNC includes: a sending module, configured to support PS handover and CS handover in a serving network, and when a user equipment is in a CS and PS connected state, send a unique first Handover Request for requesting handover to a MSC server.

In another aspect, the present invention provides a MSC server, where the MSC server includes: a receiving module, configured to receive a CS Handover Required message sent by a base station controller BSC/radio network controller RNC; a first sending module, configured to send a CS to PS Handover Request message to a target mobility management entity MME according to the CS Handover Required message received by the receiving module; a second sending module, configured to send a CS Handover Required Acknowledgement message to the BSC/RNC according to the CS Handover Required message received by the receiving module, where the CS Handover Required Acknowledgement message includes second information for determining the target MME so that the BSC/RNC sends a PS Handover Required message including the second information to a source SGSN, thereby enabling the source SGSN to send a Relocation Request message to the target MME.

In another aspect, the present invention provides a SGSN, where the SGSN includes: a receiving module, configured to receive a PS Handover Required message sent by a base station controller BSC/radio network controller RNC; a first sending module, configured to send a Relocation Request message to a target mobility management entity MME according to the PS Handover Required message received by the receiving module; a second sending module, configured to send a PS Handover Required Acknowledgement message to the BSC/RNC according to the PS Handover Required message received by the receiving module, where the PS Handover Required Acknowledgement message includes second information for determining the target MME so that the BSC/RNC sends a CS Handover Required message including the second information to a mobile switching center MSC server, thereby enabling the MSC server to send a CS to PS Handover Request message to the target MME.

Based on the above technical solutions, the method for handover to a serving network, the MSC server, the SGSN, and the MME according to embodiments of the present invention, by applying for context information from a source SGSN by using an MME determined by an MSC server, are capable of ensuring that, in a reverse single radio voice call continuity (Reverse Single Radio Voice Call Continuity, rSRVCC) handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

BRIEF DESCRIPTION OF THE DRAWINGS

To describe the technical solutions in the embodiments of the present invention more clearly, the following briefly introduces the accompanying drawing needed for describing the embodiments of the present invention. Apparently, the accompanying drawing in the following description show merely some embodiments of the present invention, and persons of ordinary skill in the art may still derive other drawings from the accompanying drawing without creative efforts.

DETAILED DESCRIPTION OF THE EMBODIMENTS

Figure 1:
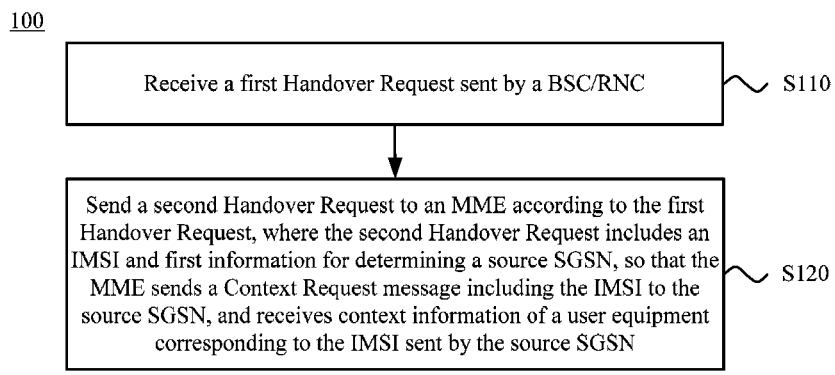
FIG. 1 is a schematic flowchart of a method for handover to a serving network according to an embodiment of the present invention.

The following clearly describes the technical solutions in the embodiments of the present invention with reference to the accompanying drawing in the embodiments of the present invention. Apparently, the described embodiments are merely a part rather than all of the embodiments of the present invention. All other embodiments obtained by persons of ordinary skill in the art based on the embodiments in the present invention without creative efforts shall fall within the protection scope of the present invention.

Compared with a CS domain network, a PS domain network is capable of providing a voice service at a higher rate with better quality to a user, and is capable of meeting more data service requirements of the user. Therefore, to develop more voice users of the PS domain network, an operator usually sets a higher priority to the PS domain than the CS domain, thereby enabling voice users to preferentially camp in the PS domain network. As a result, under the circumstance that the CS domain network coexists with the PS domain network, when a UE initiates a voice call in a CS domain of a 2G or 3G network (hereinafter referred to as a "G/U network") first, and then moves to an area which is also covered by a PS domain network, based on higher requirements on quality of the voice service or considering the limitation of the higher priority, the UE needs to switch the voice call from the CS domain to the PS domain of an LTE/HSPA network. That is, an rSRVCC handover process is performed.

In the rSRVCC handover process, a mobile switching center MSC server selects a mobility management entity MME and interacts with the MME; a source serving GPRS support node (Serving GPRS Support Node, SGSN) also selects and interacts with an MME. If the MME selected by the MSC server and the MME selected by the source SGSN are not the same, a handover failure is caused.

A technical solution is needed for enabling an MSC server and an SGSN to interact with the same MME, thereby switching a voice service from a CS domain of a G/U network to a PS domain of an LTE/HSPA network.

In order to solve the foregoing technical problem, the present invention provides the following technical solutions:

It should be understood that the technical solutions of the present invention may be applied to various communication systems, such as a GSM, a code division multiple access (CDMA) system, a wideband code division multiple access (WCDMA) system, a general packet radio service (General Packet Radio Service, GPRS) system, a long term evolution (LTE) system, an LTE frequency division duplex (FDD) system, an LTE time division duplex (TDD) system, and a UMTS).

It should also be understood that in embodiments of the present invention, a UE may be referred to as a terminal, a mobile station (MS), a mobile terminal, and the like. The UE may be connected to one or more core networks for communication through a radio access network (RAN). For example, the UE may be a mobile phone (also referred to as a "cell" phone), a computer having a mobile terminal, and the like. For example, the user equipment may also be a portable, pocket-sized, handheld, computer built-in, or vehicle-mounted mobile apparatus, which exchanges voice and/or data with a radio access network.

In the embodiments of the present invention, a base station may be a base station (BTS) in GSM or CDMA, a NodeB (NB) in WCDMA, or an evolved node B (eNB or e-NodeB") in LTE. The present invention sets no limitation thereto. However, for the convenience of description, the following embodiments are described by using a base station eNB and a UE as an example.

FIG. 1 is a schematic flowchart of a method 100 for handover to a serving network according to an embodiment of the present invention. As shown in FIG. 1, the method 100 includes:

S110. receiving a first Handover Request sent by a base station controller (\ BSC)/radio network controller (\RNC); and S120. sending a second Handover Request to a target mobility management entity MME according to the first Handover Request, where the second Handover Request includes an International Mobile Subscriber Identity (IMSI) and first information for determining a source SGSN, so that the target MME sends a Context Request message including the IMSI to the source SGSN and receives context information of a UE corresponding to the IMSI sent by the source SGSN.

In an rSRVCC handover process, when the BSC/RNC sends the unique first Handover Request for requesting handover to the MSC server, the MSC server sends the second Handover Request to the target MME, so that the target MME applies for context information from the source SGSN, thereby switching a voice service from a CS domain to a PS domain.

Therefore, the method for handover to a serving network according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

In S110, when the voice service needs to be switched from a CS domain to a PS domain, the MSC server receives a unique first Handover Request for requesting handover sent by the BSC/RNC, and alternatively, the first Handover Request includes only information related to the PS, for example, PS handover-related information. For example, the first Handover Request is a CS Handover Required (CS HO Required) message. However, the embodiment of the present invention is not limited thereto, and the first Handover Request may also be another message including the information related to the PS handover.

Alternatively, the first Handover Request is a unique message for requesting handover sent by the BSC/RNC when the serving network supports PS handover and CS handover and the UE is in a CS and PS connected state. That is, when the serving network supports PS handover and CS handover and the UE is in the CS and PS connected state, the BSC/RNC only sends a CS Handover Required message to the MSC server to trigger a CS to PS handover process, and the BSC/RNC sends no PS Handover Required (PS HO Required) message to the source SGSN.

In S120, the MSC server may select a target MME according to, for example, target evolved UMTS terrestrial radio access network cell global identity (E-UTRAN Cell Global Identity, ECGI)/tracking area identity (TAI) information, and send the second Handover Request to the target MME according to the first Handover Request, where the second Handover Request includes the IMSI and first information for determining the source SGSN, so that the target MME determines the source SGSN according to the first information, sends a Context Request message including the IMSI to the source SGSN, and receives context information of a UE corresponding to the IMSI sent by the source SGSN. Alternatively, the second Handover Request is a CS to PS Handover Request (CS to PS HO Request) message. Alternatively, the first information is an rSRVCC information element (IE).

It should be understood that the MSC server may also select or determine a target MME by using other methods. The embodiment of the present invention is merely described by using the above as an example, but is not limited thereto.

In the embodiment of the present invention, alternatively, when the serving network is a HSPA network, the first Handover Request is a Relocation Required ( ) message sent by the RNC, or a CS Handover Required message sent by the BSC, where the Relocation Required message or the CS Handover Required message includes a source RNC to target RNC transparent container, the quantity of Iu instances in the source RNC to target RNC transparent container is set to 1, and the source RNC to target RNC transparent container includes only information related to PS, for example, PS handover-related information.

Alternatively, when the serving network is a long term evolution LTE network, the first Handover Request is a Relocation Required message sent by the RNC, or a CS Handover Required message sent by the BSC, where the relocation required message or the CS Handover Required message includes a source base station to target base station transparent container, and the source base station to target base station transparent container includes only information related to PS, for example, PS handover-related information.

Figure 2:
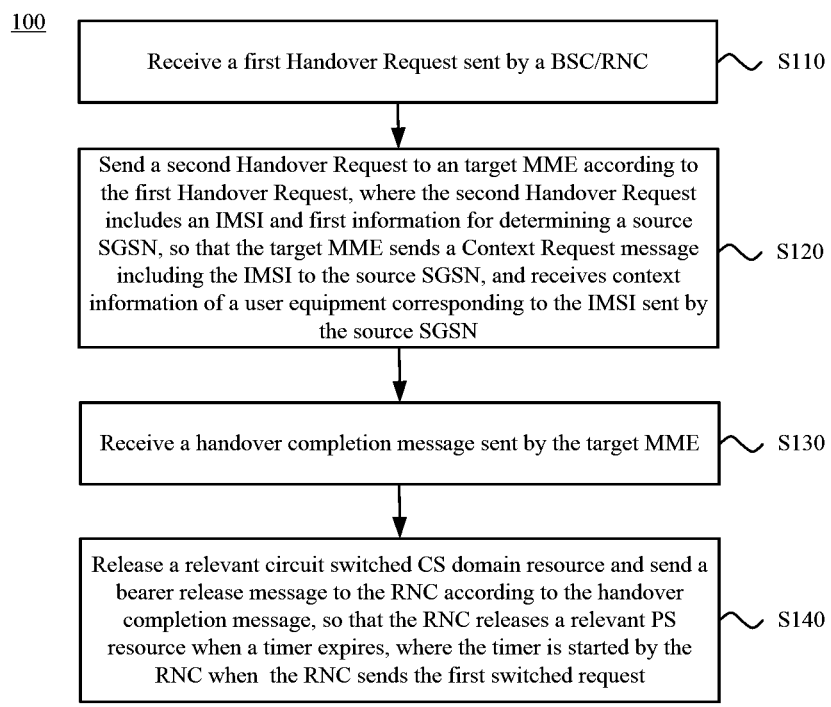
FIG. 2 is another schematic flowchart of a method for handover to a serving network according to an embodiment of the present invention.

In the embodiment of the present invention, as shown in FIG. 2, the method 100 further includes:

S130. The MSC server receives a Handover Complete message sent by the target MME.

S140. The MSC server releases a related CS resource and sending a bearer release message to the RNC according to the Handover Complete message, so that the RNC releases a related PS resource when a timer expires, where the timer is started by the RNC when sending the first Handover Request.

That is, the BSC/RNC starts the timer when sending the first Handover Request; after receiving the bearer release message sent by the MSC server, if the timer expires, releases the related PS resource; and if the timer does not time out, waits to release the related PS resource until the timer expires.

Therefore, the method for handover to a serving network according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 3:
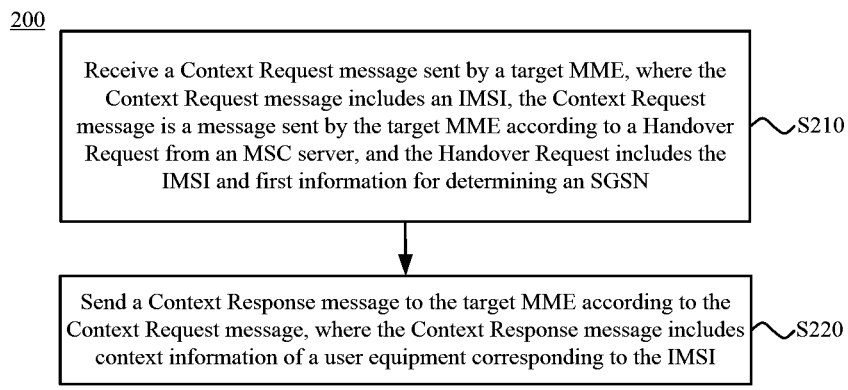
FIG. 3 is another schematic flowchart of a method for handover to a serving network according to an embodiment of the present invention.
Figure 4:
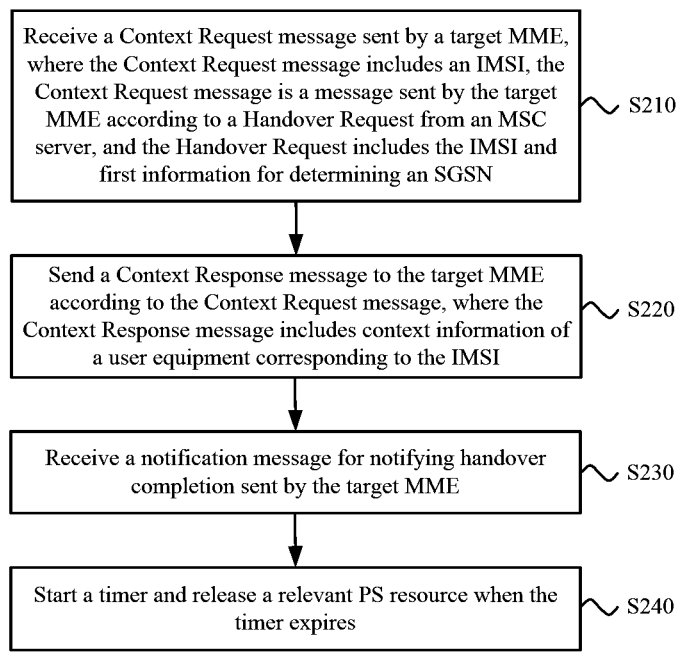
FIG. 4 is another schematic flowchart of a method for handover to a serving network according to an embodiment of the present invention.

FIG. 3 and FIG. 4 are schematic flowcharts of a method for handover to a serving network according to an embodiment of the present invention described from the point of a source SGSN. As shown in FIG. 3, a method 200 for handover to a serving network according to an embodiment of the present invention includes:

S210. receiving a Context Request message sent by a target mobility management entity MME, where the Context Request message includes an international mobile subscriber identity IMSI, the Context Request message is a message sent by the target MME according to a Handover Request from a MSC server, and the Handover Request includes the IMSI and first information for determining a SGSN; and S220. sending a Context Response message to the target MME according to the Context Request message, where the Context Response message includes context information of a UE corresponding to the IMSI.

In S210, the source SGSN receives the Context Request message sent by the target MME, where the Context Request message includes the IMSI. Alternatively, the Context Request message further includes first information such as rSRVCC IE, so that the source SGSN may be aware of an rSRVCC operation according to the first information.

In S220, the source SGSN sends the context information of the UE corresponding to the IMSI to the target MME according to the Context Request message.

It should be understood that the Context Request message and the Context Response message may be existing messages or newly defined messages, and the embodiment of the present invention is not limited thereto.

In the embodiment of the present invention, alternatively, as shown in FIG. 4, the method 200 further includes:

S230. The source SGSN receives a notification message for notifying handover completion sent by the target MME.

S240. The source SGSN starts a timer, and releases a related PS resource when the timer expires.

In S230, the notification message is used to notify handover completion. For example, the notification message is a Context Request Acknowledgement message or a Handover Notify message, and the like. Alternatively, the notification message is a message sent by the target MME for confirming receipt of the context information according to a Handover Notify message from the base station.

In S240, the source SGSN, after receiving the notification message, starts the timer for monitoring and ensuring that a resource of the BSC/RNC and a serving gateway (SGW) is released. That is, when the provided timer expires, the related PS resource is released.

Specifically, the releasing the related PS resource when the timer expires includes:

when the timer expires, releasing the related PS resource on the SGSN, and sending a Release Resource message to the BSC/RNC, so that the BSC/RNC releases the related PS releases according to the Release Resource message.

Alternatively, if the SGSN is an S4 SGSN and a change occurs on the serving gateway SGW, a Delete Session Request message is sent to the SGW, so that the SGW releases the related PS resource according to the Delete Session Request message.

Therefore, the method for handover to a serving network according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 5:
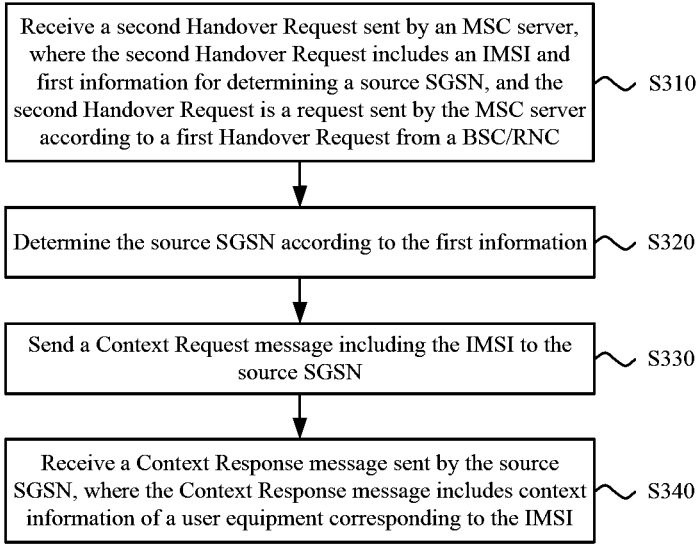
FIG. 5 is another schematic flowchart of a method for handover to a serving network according to an embodiment of the present invention.
Figure 6:
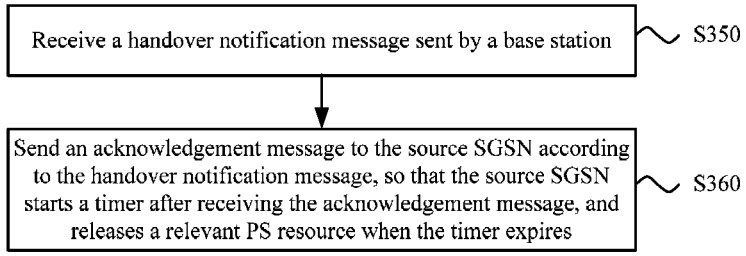
FIG. 6 is another schematic flowchart of a method for handover to a serving network according to an embodiment of the present invention.

FIG. 5 and FIG. 6 are schematic flowcharts of a method for handover to a serving network according to an embodiment of the present invention described from the point of a target MME. As shown in FIG. 5, a method 300 for handover to a serving network according to an embodiment of the present invention includes:

S310. receiving a second Handover Request sent by a MSC server, where the second Handover Request includes an international mobile subscriber identity IMSI and first information for determining a source SGSN, and the second Handover Request is a request sent by the MSC server according to a first Handover Request from a base station controller BSC/radio network controller RNC;

S320. determining the source SGSN according to the first information;

S330. sending a Context Request message including the IMSI to the source SGSN; and S340. receiving a Context Response message sent by the source SGSN, where the Context Response message includes context information of a UE corresponding to the IMSI.

In S310, the second Handover Request is, for example, a CS to PS Handover Required message, the CS to PS Handover Required message includes the IMSI and the first information, where the first information is, for example, an rSRVCC IE, and the IMSI is used for the source SGSN to find the context information of the corresponding UE. Alternatively, the first Handover Request includes only information related to the PS, for example, PS handover-related information.

In S320, the target MME, for example, performs parsing according to the rSRVCC IE to obtain an address of the source SGSN according to the rSRVCC IE.

In S330, the target MME sends the Context Request message including the IMSI to the source SGSN, where the Context Request message may further includes the first information so that the source SGSN identifies an rSRVCC operation.

In S340, the target MME receives message including the context information of the UE corresponding to the IMSI sent by the source SGSN. For example, the source SGSN carries the context information by using a Context Response message.

In the embodiment of the present invention, as shown in FIG. 6, alternatively, the method 300 further includes:

S350. The target MME receives a Handover Notify message sent by the base station.

S360. The MME sends a notification message for notifying handover completion to the source SGSN according to the Handover Notify message, so that the source SGSN starts a timer after receiving the notification message, and releases a related PS resource when the timer expires.

Alternatively, the notification message is a Context Request Acknowledgement message or a Handover Notify message, and the like.

Therefore, the method for handover to a serving network according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

A method for handover to a serving network according to embodiments of the present invention is described in detail above respectively from the point of the MSC server, the source SGSN, and the target MME with reference to FIG. 1 to FIG. 6. The method according to the embodiments of the present invention is further described in detail as follows with reference to FIG. 7.

Figure 7:
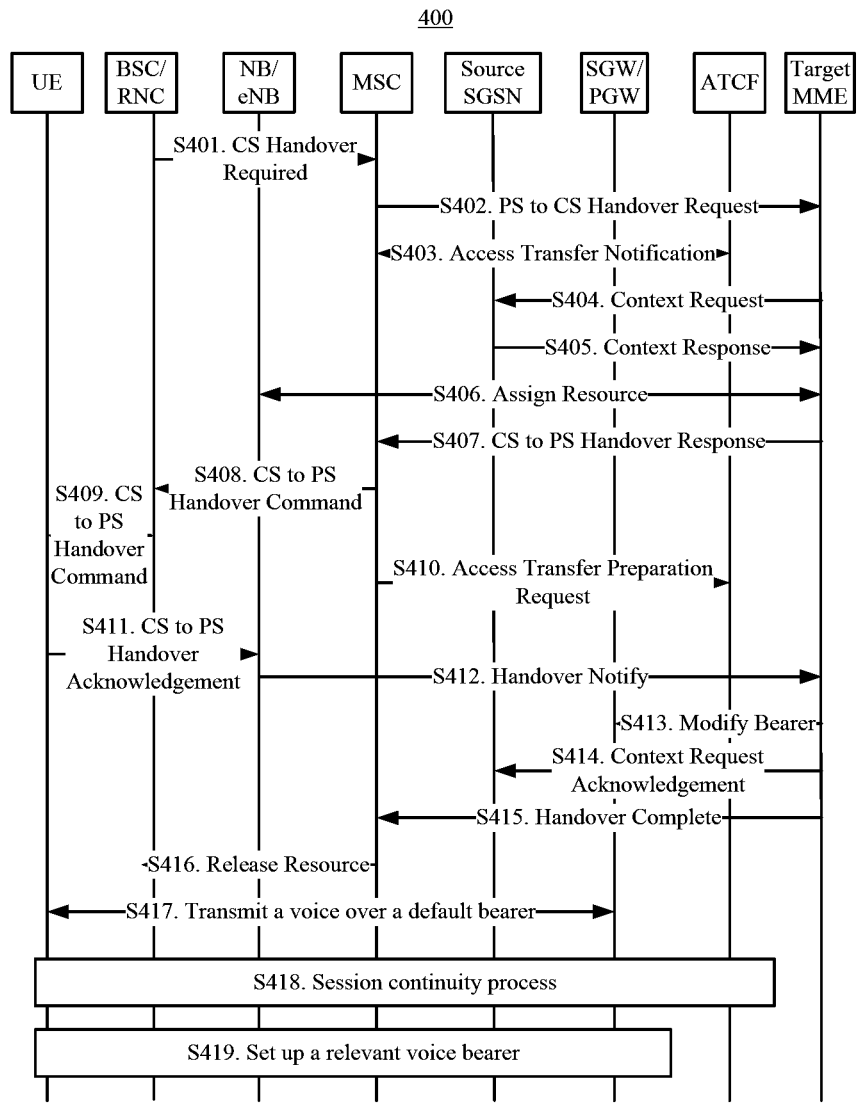
FIG. 7 is a detailed flowchart of a method for handover to a serving network according to an embodiment of the present invention.

As shown in FIG. 7, a method 400 for handover to a serving network according to an embodiment of the present invention includes:

S401. A BSC/RNC sends a CS Handover Required message for requesting handover to an MSC server, where the CS Handover Required message is the only message for requesting handover sent by the BSC/RNC. That is, the BSC/RNC sends no PS Handover Required message to a source SGSN. Alternatively, the CS Handover Required message includes only information related to a PS, for example, PS handover-related information.

S402. The MSC server selects a target MME according to target ECGI/TAI information, and sends a CS to PS Handover Request message to the selected target MME according to the CS Handover Required message, where the CS to PS Handover Request message includes an IMSI and an rSRVCC IE for determining a source SGSN.

S403. The MSC server sends an Access Transfer Notification to an access transfer control function entity (Access Transfer Control Function, ATCF).

S404. The target MME parses and obtains an address of the source SGSN according to the rSRVCC IE, and sends a Context Request message including the IMSI and the rSRVCC IE to the source SGSN.

S405. The source SGSN perceives an rSRVCC operation according to the rSRVCC IE, thereby finding context information of a related UE by using the IMSI, and then sends the context information of the UE to the target MME by using a Context Response message.

S406. The target MME triggers a target eNB to perform a resource setup process.

S407. The target MME returns a CS to PS Handover Response message to the MSC server.

S408. The MSC server sends a CS to PS Handover Command to the BSC/RNC.

S409. The BSC/RNC sends the CS to PS Handover Command to the UE.

S410. The MCS server sends an Access Transfer Preparation Request message to the ATCF.

S411. The UE sends a CS to PS Handover Acknowledgement message to the eNB.

S412. The eNB sends a Handover Notify message to the target MME.

S413. The target MME sends a Modify Bearer message to an SGW/packet gateway (PGW).

S414. The target MME sends a Context Request Acknowledgement (Context Request ACK) message to the source SGSN.

Alternatively, the target MME may send a Handover Notify message to the source SGSN to notify handover completion. Specifically, the target MME does not send the Context Request ACK to the source SGSN until the target MME receives Handover Notify in S412. The source SGSN, after receiving the Context Request ACK message, starts a timer for monitoring and ensuring that a resource of the BSC/RNC and the serving SGW is released. That is, when the provided timer expires, the related PS resource is released. Specifically, the SGSN sends a Release Resource message to the BSC/RNC to delete a resource related to PS. If the SGSN is an S4 SGSN and a change occurs on the SGW, the S4 SGSN sends a Delete Session Request message to the original SGW to delete a related resource.

Alternatively, after the target MME receives Handover Notify in S412, the target MME sends a message such as Handover notify to the source SGSN, and the source SGSN starts a timer for monitoring and ensuring that a resource of the BSC/RNC and the serving SGW is released. That is, when the provided timer expires, the related PS resource is released.

S415. The target MME sends a Handover Complete message to the MSC server.

S416. The MSC server sends a Release Resource message to the BSC/RNC.

S417. The UE and the SGW/PGW transmit a voice over a default bearer;

S418. A session continuity process is performed

S419. A related voice bearer is set up.

It should be understood that a value of a serial number of each process does not indicate an execution sequence. The execution sequence of each process should be determined according to functions and inner logic thereof, and should not set any limitation to an implementation process of the embodiment of the present invention.

Therefore, the method for handover to a serving network according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 8:
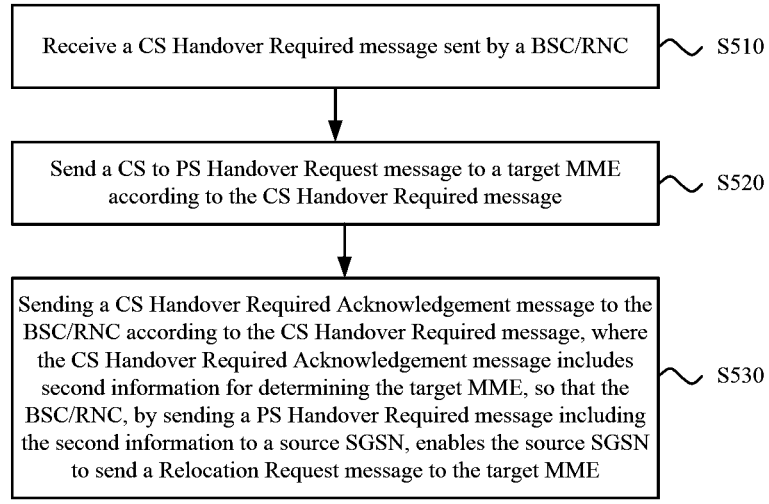
FIG. 8 is a schematic flowchart of a method for handover to a serving network according to another embodiment of the present invention.

An embodiment of the present invention further provides a method 500 for handover to a serving network. As shown in FIG. 8, the method 500 includes:

S510. An MSC server receives a CS Handover Required message sent by a base station controller BSC/radio network controller RNC.

S520. The MSC server sends a CS to PS Handover Request message to a target mobility management entity MME according to the CS Handover Required message; and S530. The MSC server sends a CS Handover Required Acknowledgement message to the BSC/RNC according to the CS Handover Required message, where the CS Handover Required Acknowledgement message includes second information for determining the target MME, so that the BSC/RNC sends a PS Handover Required message including the second information to a source SGSN, thereby enabling the source SGSN to send a Relocation Request message to the target MME.

The BSC/RNC needs to send a CS Handover Required (CS HO Required) message to the MSC server first. The MSC server selects a target MME according to, for example, target ECGI/TAI information, and sends a CS to PS Handover Request (CS to PS HO request) message to the target MME, thereby triggering a subsequent process. Meanwhile, the MSC server sends a CS Handover Required Acknowledgement (CS HO Required ACK) message to the BSC/RNC, where the CS Handover Required Acknowledgement message includes the second information for determining the target MME selected by the MSC server. Therefore, the BSC/RNC sends the PS Handover Required (PS HO Required) message including the second information to the source SGSN, thereby enabling the source SGSN to determine the target MME according to the second information, and send a Relocation Request (Relocation Request) message to the target MME. In this way, it is ensured that the MSC server and the SGSN select the same MME.

To synchronize PS and CS handovers, in the embodiment of the present invention, alternatively, the PS Handover Required message further includes third information for indicating that a concurrent CS to PS Handover Request message exists, so that the source SGSN sends the third information to the target MME by using the Relocation Request message, thereby enabling the target MME to synchronize CS handover and PS handover.

Therefore, the method for handover to a serving network according to the embodiment of the present invention, by returning information about a target MME determined by an MSC server to a BSC/RNC by using the MSC server, and sending a CS Handover Required message including the information to a source SGSN by using the BSC/RNC, enables the source SGSN to interact with the target MME determined by the MSC server, which may ensure that the MSC server and the SGSN interact with the same MME, thereby switching a voice service from a CS domain to a PS domain, synchronizing PS and CS handover processes, improving handover accuracy and efficiency, and enhancing user experience.

Figure 9:
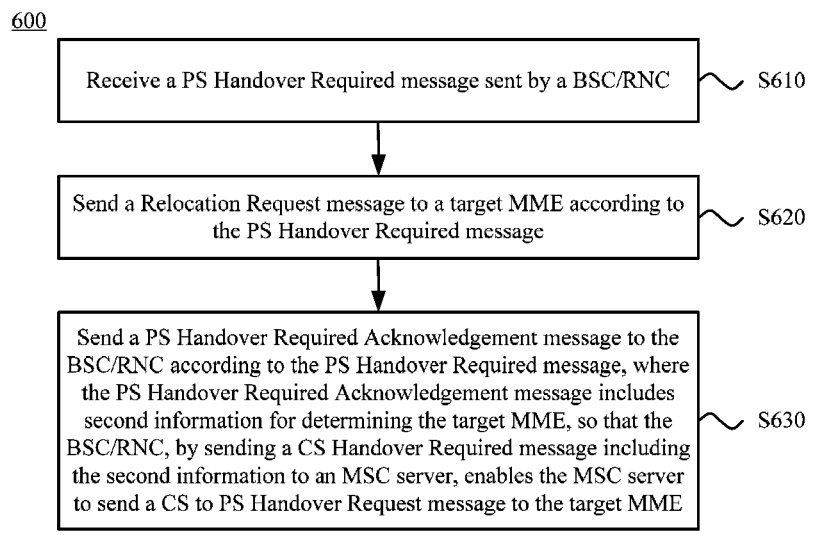
FIG. 9 is a schematic flowchart of a method for handover to a serving network according to another embodiment of the present invention.

As shown in FIG. 9, an embodiment of the present invention further provides a method 600 for handover to a serving network. The method 600 includes:

S610. receiving a PS Handover Required message sent by a base station controller BSC/radio network controller RNC;

S620. sending a Relocation Request message to a target mobility management entity MME according to the PS Handover Required message; and S630. sending a PS Handover Required Acknowledgement message to the BSC/RNC according to the PS Handover Required message, where the PS Handover Required Acknowledgement message includes second information for determining the target MME, so that the BSC/RNC sends a CS Handover Required message including the second information to a MSC server, thereby enabling the MSC server to send a CS to PS Handover Request message to the target MME.

The BSC/RNC needs to send a PS Handover Required (PS HO Required) message to the source SGSN first. The source SGSN selects a target MME according to, for example, target ECGI/TAI information, and sends a Relocation Request (Relocation Request) message to the target MME, thereby triggering a subsequent process. Meanwhile, the source SGSN sends a PS Handover Required Acknowledgement (PS HO Required ACK) message to the BSC/RNC, where the PS handover required acknowledgement message includes the second information for determining the target MME selected by the SGSN. Therefore, the BSC/RNC sends the CS Handover Required (CS HO Required) message including the second information to the MSC server, thereby enabling the MSC server to send a CS to PS Handover Request (CS to PS HO Request) message to the target MME. Hence, it is ensured that the MSC server and the SGSN select the same MME.

To synchronize PS and CS handovers, in the embodiment of the present invention, alternatively, the PS Handover Required message and the Relocation Request message further include third information for indicating that a concurrent CS to PS Handover Request message exists, so that the target MME synchronizes CS handover and PS handover. That is, the target MME, after receiving the Relocation Request message, becomes aware of a concurrent CS to PS Handover Request message according to the third information. Therefore, the target MME waits for the CS to PS Handover Request message, thereby synchronizing CS and PS handover.

Therefore, the method for handover to a serving network according to the embodiment of the present invention, by returning information about a target MME determined by an SGSN to a BSC/RNC by using the SGSN, and sending a PS Handover Required message including the information to An MSC server by using the BSC/RNC, enables the MSC server to interact with the target MME determined by the SGSN, which may ensure that the MSC server and the SGSN interact with the same MME, thereby switching a voice service from a CS domain to a PS domain, synchronizing PS and CS handover processes, improving handover accuracy and efficiency, and enhancing user experience.

Figure 10:
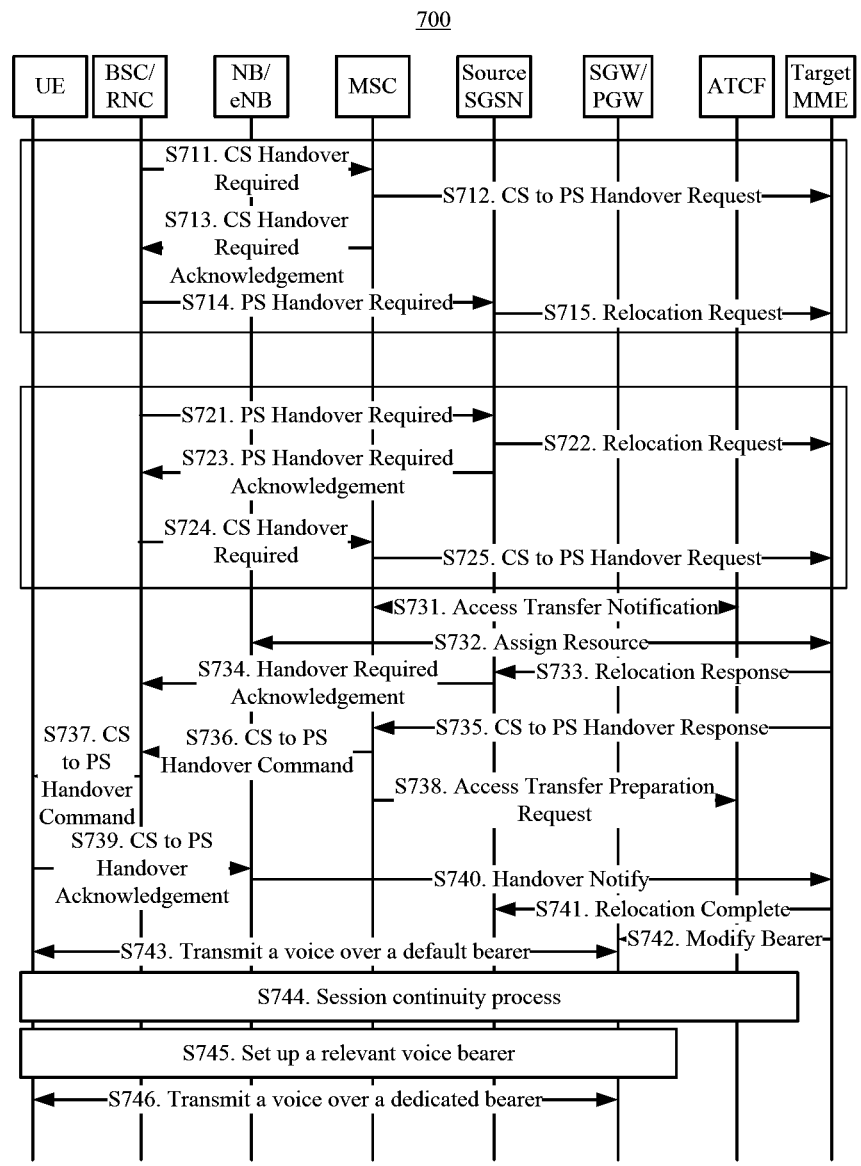
FIG. 10 is another detailed flowchart of a method for handover to a serving network according to an embodiment of the present invention.

The method for handover to a serving network according to an embodiment of the present invention is further described in detail with reference to FIG. 10. As shown in FIG. 10, the method 700 includes the following steps.

If a BSC/RNC sends a CS Handover Required message first, a process from S711 to S715 is performed; if the BSC/RNC sends a PS Handover Required message first, a process from S721 to S725 is performed.

S711. A BSC/RNC sends a CS Handover Required message to an MSC server.

S712. The MSC server determines a target MME according to the CS Handover Required message, and sends a CS to PS Handover Request message to the target MME.

S713. The MSC server sends a CS Handover Required Acknowledgement message to the BSC/RNC according to the CS Handover Required message, where the CS Handover Required Acknowledgement message includes second information for indicating the target MME determined by the MSC server.

S714. The BSC/RNC sends a PS Handover Required message including the second information to a source SGSN.

S715. The source SGSN determines the target MME according to the second information in the PS Handover Required message, and sends a Relocation Request message to the target MME.

S721. The BSC/RNC sends a PS Handover Required message to the source SGSN.

S722. The source SGSN determines a target MME according to the PS Handover Required message, and sends a Relocation Request message to the target MME.

S723. The source SGSN sends a PS Handover Required Acknowledgement message to the BSC/RNC according to the PS Handover Required message, where the PS Handover Required Acknowledgement message includes second information for indicating the target MME determined by the source SGSN.

S724. The BSC/RNC sends a CS Handover Required message including the second information to the MSC server.

S725. The MSC server determines the target MME according to the second information, and sends a CS to PS Handover Request message to the target MME.

S731. The MSC server sends an Access Transfer Notification (Access Transfer Notification) to an ATCF.

S732. The target MME triggers a target eNB to perform a resource setup process.

S733. The target MME sends a relocation response message to the source SGSN.

S734. The source SGSN sends a Handover Required Acknowledgement (HO Required ACK) message to the BSC/RNC.

S735. The target MME returns a CS to PS Handover Response message to the MSC server.

S736. The MSC server sends a CS to PS Handover Command (CS to PS HO Command) to the BSC/RNC.

S737. The BSC/RNC sends the CS to PS Handover Command to a UE.

S738. The MSC server sends an Access Transfer Preparation Request (Access Transfer Preparation Request) message to the ATCF.

S739. The UE sends a CS to PS handover acknowledgement message to the eNB.

S740. The eNB sends a Handover Notify (Handover Notify) to the target MME.

S741. The target MME sends a relocation completion message to the source SGSN.

S742. The target MME sends a Modify Bearer message to an SGW/PGW.

S743. The UE and the SGW/PGW transmit a voice over a default bearer.

S744. Perform a session continuity process.

S745. Set up a related voice bearer.

S746. The UE and the SGW/PGW transmit a voice over a dedicated bearer.

It should be understood that a value of a serial number of each process does not indicate an execution sequence. The execution sequence of each process should be determined according to functions and inner logic thereof, and should not set any limitation to an implementation process of the embodiment of the present invention. For example, S712 and S713 may be performed simultaneously, and S722 and S723 may also be performed simultaneously.

Therefore, the method for handover to a serving network according to the embodiment of the present invention, by notifying an MSC server of a target MME determined by an SGSN, or notifying the SGSN of a target MME determined by the MSC server, ensures that the MSC server and the SGSN interact with the same MME, thereby switching a voice service from a CS domain to a PS domain, synchronizing PS and CS handover processes, improving handover accuracy and efficiency, and enhancing user experience.

The method for handover to a serving network according to the embodiments of the present invention is described in detail above with reference to FIG. 1 to FIG. 10. The following describes an MSC server, an SGSN, and an MME for implementing the above method according to embodiments of the present invention in detail with reference to FIG. 11 to FIG. 20.

Figure 11:
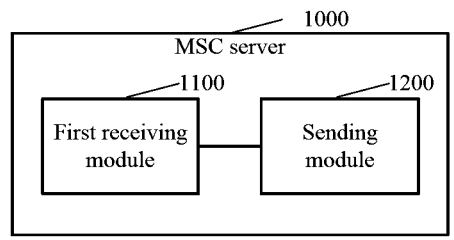
FIG. 11 is a schematic block diagram of an MSC server according to an embodiment of the present invention.

FIG. 11 is a schematic block diagram of an MSC server 1000 according to an embodiment of the present invention. As shown in FIG. 11, the MSC server 1000 includes:

a first receiving module 1100, configured to receive a first Handover Request sent by a base station controller BSC/radio network controller RNC; and a sending module 1200, configured to send a second Handover Request to a target mobility management entity MME according to the first Handover Request received by the first receiving module 1100, where the second Handover Request includes an international mobile subscriber identity IMSI and first information for determining a source SGSN, so that the target MME sends a Context Request message including the IMSI to the source SGSN and receives context information of a UE corresponding to the IMSI sent by the source SGSN.

The MSC server according to the embodiment of the present invention, by applying for context information from a source SGSN by using an MME determined by the MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 12:
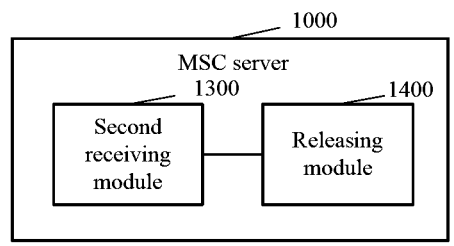
FIG. 12 is another schematic block diagram of an MSC server according to an embodiment of the present invention.

In the embodiment of the present invention, alternatively, as shown in FIG. 12, the MSC server 1000 further includes:

a second receiving module 1300, configured to receive a Handover Complete message sent by the target MME; and a releasing module 1400, configured to release a related CS resource and send a bearer release message to the RNC according to the Handover Complete message received by the second receiving module 1300, so that the RNC releases a related PS resource when a timer expires, where the timer is started by the RNC when sending the first Handover Request.

Alternatively, the first Handover Request received by the first receiving module 1100 includes only PS handover-related information.

Alternatively, the first Handover Request received by the first receiving module 1100 is a unique message for requesting handover sent by the BSC/RNC when the serving network supports PS handover and CS handover and the UE is in a CS and PS connected state.

Alternatively, when the serving network is a HSPA network, the first Handover Request received by the first receiving module 1100 is a Relocation Required message sent by the RNC, or a CS Handover Required message sent by the BSC, where the Relocation Required message or the CS Handover Required message includes a source RNC to target RNC transparent container, the quantity of Iu instances in the source RNC to target RNC transparent container is set to 1, and the source RNC to target RNC transparent container includes only PS handover-related information.

Alternatively, when the serving network is a long term evolution LTE network, the first Handover Request received by the first receiving module 1100 is a Relocation Required message sent by the RNC, or a CS Handover Required message sent by the BSC, where the Relocation Required message or the CS Handover Required message includes a source base station to target base station transparent container, and the source base station to target base station transparent container includes only PS handover-related information.

The MSC server 1000 according to the embodiment of the present invention may correspond to the MSC server in the embodiments of the present invention, and the above and other operations and/or functions of modules in the MSC server 1000 are respectively configured to implement corresponding processes in the methods 100 to 400 in FIG. 1 to FIG. 7, which will not be described repeatedly herein for the sake of brevity.

The MSC server according to the embodiment of the present invention, by applying for context information from a source SGSN by using an MME determined by the MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 13:
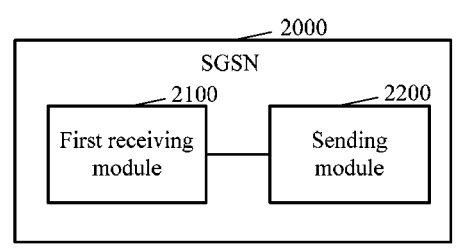
FIG. 13 is a schematic block diagram of an SGSN according to an embodiment of the present invention.

FIG. 13 is a schematic block diagram of an SGSN 2000 according to an embodiment of the present invention. As shown in FIG. 13, the SGSN 2000 includes:

a first receiving module 2100, configured to receive a Context Request message sent by a target mobility management entity MME, where the Context Request message includes an international mobile subscriber identity IMSI, the Context Request message is a message sent by the target MME according to a Handover Request from a MSC server, and the Handover Request includes the IMSI and first information for determining a SGSN; and a sending module 2200, configured to send a Context Response message to the target MME according to the Context Request message received by the first receiving module 2100, where the Context Response message includes context information of a UE corresponding to the IMSI.

Figure 14:
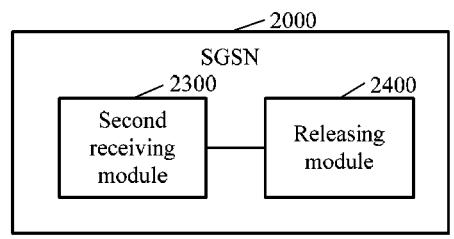
FIG. 14 is another schematic block diagram of an SGSN according to an embodiment of the present invention.

In the embodiment of the present invention, alternatively, as shown in FIG. 14, the SGSN 2000 further includes:

a second receiving module 2300, configured to receive a notification message for notifying handover completion sent by the target MME; and a releasing module 2400, configured to start a timer, and release a related PS resource when the timer expires.

Alternatively, the notification message received by the second receiving module 2300 is a message sent by the target MME for confirming receipt of the context information according to a Handover Notify message from the base station.

Figure 15:
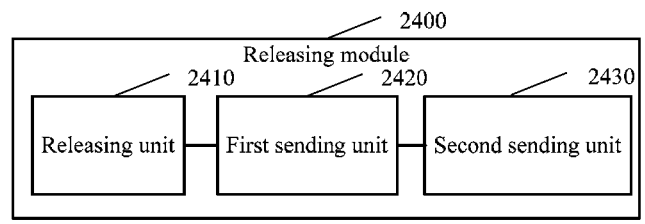
FIG. 15 is a schematic block diagram of a releasing module according to an embodiment of the present invention.

Alternatively, as shown in FIG. 15, the releasing module 2400 includes:

a releasing unit 2410, configured to release the related PS resource on the SGSN when the timer expires; and a first sending unit 2420, configured to send a Release Resource message to the base station controller BSC/radio network controller RNC, so that the BSC/RNC releases a related PS resource according to the Release Resource message.

Alternatively, as shown in FIG. 15, the releasing module 2400 further includes:

a second sending unit 2430, configured to send, when the SGSN is an S4 SGSN and a change occurs on a serving gateway SGW, a Delete Session Request message to the SGW, so that the SGW releases the related PS resource according to the Delete Session Request message.

The SGSN 2000 according to the embodiment of the present invention may correspond to the SGSN in the embodiments of the present invention, and the above and other operations and/or functions of modules in the SGSN 2000 are respectively configured to implement corresponding processes in the methods 100 to 400 in FIG. 1 to FIG. 7, which will not be described repeatedly herein for the sake of brevity.

The SGSN according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 16:
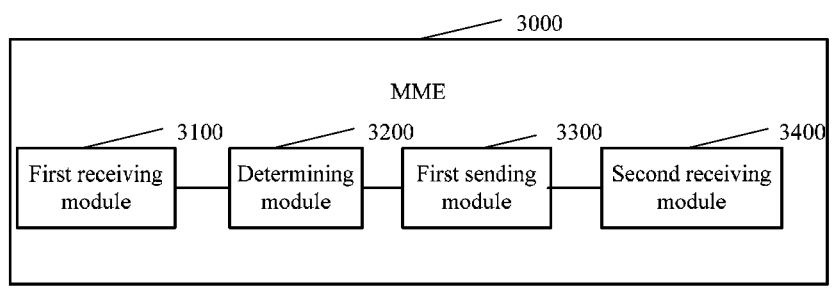
FIG. 16 is a schematic block diagram of an MME according to an embodiment of the present invention.

FIG. 16 is a schematic block diagram of an MME 3000 according to an embodiment of the present invention. As shown in FIG. 16, the MME 3000 includes:

a first receiving module 3100, configured to receive a second Handover Request sent by a MSC server, where the second Handover Request includes an international mobile subscriber identity IMSI and first information for determining a source SGSN, and the second Handover Request is a request sent by the MSC server according to a first Handover Request from a base station controller BSC/radio network controller RNC;

a determining module 3200, configured to determine the source SGSN according to the first information included in the second Handover Request received by the first receiving module 3100;

a first sending module 3300, configured to send a Context Request message including the IMSI to the source SGSN determined by the determining module 3200; and a second receiving module 3400, configured to receive a Context Response message sent by the source SGSN, where the Context Response message includes context information of a UE corresponding to the IMSI.

Figure 17:
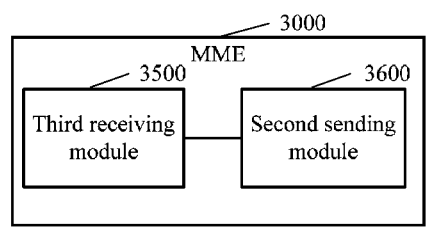
FIG. 17 is another schematic block diagram of an MME according to an embodiment of the present invention.

In the embodiment of the present invention, alternatively, as shown in FIG. 17, the MME 3000 further includes:

a third receiving module 3500, configured to receive a Handover Notify message sent by a base station; and a second sending module 3600, configured to send a notification message for notifying handover completion to the source SGSN according to the Handover Notify message received by the third receiving module 3500, so that the source SGSN starts a timer after receiving the notification message, and releases a related PS resource when the timer expires.

Alternatively, the second Handover Request received by the first receiving module 3100 is a request sent by the MSC server according to the first Handover Request from the BSC/RNC, and the first Handover Request includes only PS handover-related information.

The MME 3000 according to the embodiment of the present invention may correspond to the target MME in the embodiments of the present invention, and the above and other operations and/or functions of modules in the MME 3000 are respectively configured to implement corresponding processes in the methods 100 to 400 in FIG. 1 to FIG. 7, which will not be described repeatedly herein for the sake of brevity.

The MME according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 18:
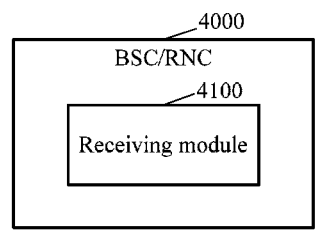
FIG. 18 is a schematic block diagram of a BSC/RNC according to an embodiment of the present invention.

FIG. 18 is a schematic block diagram of a base station controller BSC/radio network controller RNC 4000 according to an embodiment of the present invention. As shown in FIG. 18, the BSC/RNC 4000 includes:

a sending module 4100, configured to send, when a serving network supports PS handover and CS handover, and a UE is in a CS and PS connected state, a unique first Handover Request for requesting handover to a MSC server.

In the embodiment of the present invention, alternatively, when the serving network is a long term evolution LTE network, the first Handover Request sent by the sending module is a Relocation Required message sent by the RNC, or a CS Handover Required message sent by the BSC, where the Relocation Required message or the CS Handover Required message includes a source base station to target base station transparent container, and the source base station to target base station transparent container includes only PS handover-related information.

The BSC/RNC 4000 according to the embodiment of the present invention may correspond to the BSC/RNC in the embodiments of the present invention, and the above and other operations and/or functions of modules in the BSC/RNC 4000 are respectively configured to implement corresponding processes in the methods 100 to 400 in FIG. 1 to FIG. 7, which will not be described repeatedly herein for the sake of brevity.

The BSC/RNC according to the embodiment of the present invention, by applying for context information from a source SGSN by using an MME determined by an MSC server, ensures that, in a rSRVCC handover process, the MSC server and the SGSN interact with the same MME to switch a voice service from a CS domain to a PS domain, thereby avoiding a handover failure because the MSC server and the SGSN select different MMEs, and further synchronizing PS and CS handover processes, improving handover accuracy and efficiency, and enhancing user experience.

Figure 19:
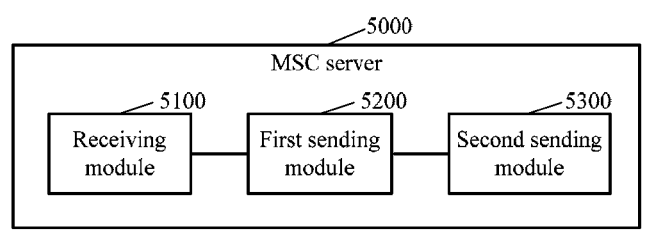
FIG. 19 is a schematic block diagram of an MSC server according to another embodiment of the present invention.

FIG. 19 is a schematic block diagram of an MSC server 5000 according to another embodiment of the present invention. As shown in FIG. 19, the MSC server 5000 includes:

a receiving module 5100, configured to receive a CS Handover Required message sent by a base station controller BSC/radio network controller RNC;

a first sending module 5200, configured to send a CS to PS Handover Request message to a target mobility management entity MME according to the CS Handover Required message received by the receiving module 5100; and a second sending module 5300, configured to send a CS Handover Required Acknowledgement message to the BSC/RNC according to the CS Handover Required message received by the receiving module 5100, where the CS Handover Required Acknowledgement message includes second information for determining the target MME, so that the BSC/RNC sends a PS Handover Required message including the second information to a source SGSN, thereby enabling the source SGSN to send a Relocation Request message to the target MME.

Alternatively, the PS Handover Required message further includes third information for indicating that a concurrent CS to PS Handover Request message exists, so that the source SGSN sends the third information to the target MME by using the Relocation Request message, thereby enabling the target MME to synchronize CS handover and PS handover.

The MSC server 5000 according to the embodiment of the present invention may correspond to the MSC server in the embodiments of the present invention, and the above and other operations and/or functions of modules in the MSC server 5000 are respectively configured to implement corresponding processes in the methods 500 and 700 in FIG. 8 and FIG. 10, which will not be described repeatedly herein for the sake of brevity.

Therefore, the MSC server according to the embodiment of the present invention, by returning information about a target MME determined by an MSC server to a BSC/RNC by using the MSC server, and sending a CS Handover Required message including the information to a source SGSN by using the BSC/RNC, enables the source SGSN to interact with the target MME determined by the MSC server, which may ensure that the MSC server and the SGSN interact with the same MME, thereby switching a voice service from a CS domain to a PS domain, synchronizing PS and CS handover processes, improving handover accuracy and efficiency, and enhancing user experience.

Figure 20:
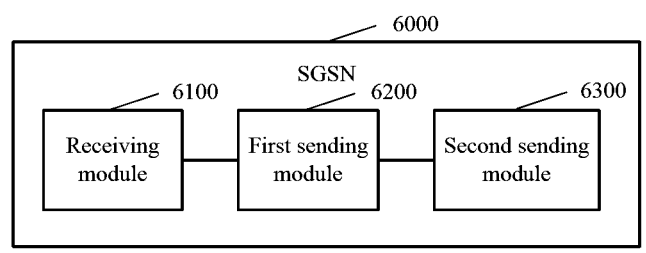
FIG. 20 is a schematic block diagram of an SGSN according to another embodiment of the present invention.

FIG. 20 is a schematic block diagram of an SGSN 6000 according to another embodiment of the present invention. As shown in FIG. 20, the SGSN 6000 includes:

a receiving module 6100, configured to receive a PS Handover Required message sent by a base station controller BSC/radio network controller RNC;

a first sending module 6200, configured to send a Relocation Request message to a target mobility management entity MME according to the PS Handover Required message received by the receiving module 6100; and a second sending module 6300, configured to send a PS Handover Required Acknowledgement message to the BSC/RNC according to the PS Handover Required message received by the receiving module 6100, where the PS Handover Required Acknowledgement message includes second information for determining the target MME, so that the BSC/RNC sends a CS Handover Required message including the second information to MSC server, thereby enabling the MSC server to send a CS to PS Handover Request message to the target MME.

Alternatively, the Relocation Request message sent by the first sending module 6200 and the PS Handover Required message sent by the second sending module 6300 further include third information for indicating that a concurrent CS to PS Handover Request message exists, so that the target MME synchronizes CS handover and PS handover.

The SGSN 6000 according to the embodiment of the present invention may correspond to the SGSN 6000 in the embodiments of the present invention, and the above and other operations and/or functions of modules in the SGSN 6000 are respectively configured to implement corresponding processes in the methods 600 and 700 in FIG. 9 and FIG. 10, which will not be described repeatedly herein for the sake of brevity.

Therefore, the SGSN according to the embodiment of the present invention, by returning information about a target MME determined by an SGSN to a BSC/RNC by using the SGSN, and sending a PS Handover Required message including the information to An MSC server by using the BSC/RNC, enables the MSC server to interact with the target MME determined by the SGSN, which may ensure that the MSC server and the SGSN interact with the same MME, thereby switching a voice service from a CS domain to a PS domain, synchronizing PS and CS handover processes, improving handover accuracy and efficiency, and enhancing user experience.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into a processing unit, or each of the units may exist alone physically, or two or more units may be integrated into a unit. The integrated unit may be implemented in the form of hardware, or may be implemented in the form of a software functional unit.

When the integrated unit are implemented in the form of a software functional unit and sold or used as an independent product, the integrated unit may be stored in a computerreadable storage medium. Based on such an understanding, the technical solutions of the present invention essentially, or the part contributing to the prior art, or all or a part of the technical solutions may be implemented in the form of software product. The computer software product is stored in a storage medium and includes several instructions for instructing a computer device (which may be a personal computer, a server, or a network device) to perform all or a part of steps of the method described in the embodiments of the present invention. The storage medium includes: any medium that can store program code, such as a USB flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any equivalent modification or replacement figured out by persons skilled in the art within the technical scope of the present invention shall fall within the protection scope of the present invention. Therefore, the protection scope of the present invention shall be subject to the protection scope of the claims.

What is claimed is:

1. A method for handover from a circuit switched (CS) 2G/3G network to a packet switched (PS) long term evolution (LTE)/high speed access (HSPA) network, comprising:
   receiving a first Handover Request for a user equipment (UE) sent by one of a base station controller (BSC) and a radio network controller (RNC), when the PS LTE/HSPA network supports a PS handover and a CS handover, and the UE is in a dual transfer mode, wherein the first handover request is a message for requesting a handover sent by one of the BSC and the RNC and no other message for requesting a handover is sent by one of the BSC and the RNC; and
   sending a second Handover Request to a target mobility management entity (MME) according to the first Handover Request, wherein the second Handover Request comprises an international mobile subscriber identity (IMSI) and first information for determining a source serving General Packet Radio Service (GPRS) support node (SGSN), the second handover request is configured to indicate the target MME to send a Context Request message comprising the IMSI to the source SGSN and receives context information of the UE that is associated with the IMSI and is sent by the source SGSN;
   receiving a Handover Notify message sent by a base station; and
   sending a notification message for notifying handover completion to the source SGSN according to the Handover Notify message, wherein a timer is started by RNC when the RNC sends the first Handover Request, and after sending a notification message, if the timer expires, releasing a related PS source, and if the timer does not expire, waiting to release the related PS resource until the timer expires.

2. The method according to claim 1, wherein the first Handover Request comprises only PS handover-related information.

3. The method according to claim 1, wherein when the handover is carried out from the CS 2G/3G network to the PS LTE/HSPA network, the first Handover Request is one of a Relocation Required message sent by the RNC, and a CS Handover Required message sent by the BSC, wherein the Relocation Required message or the CS Handover Required message comprises a source base station to target base station transparent container, and the source base station to target base station transparent container comprises only PS handover-related information.

4. A method for handover from a circuit switched (CS) 2G/3G network to a packet switched (PS) long term evolution (LTE)/high speed access (HSPA) network, comprising:
   receiving a second Handover Request sent by a mobile switching center (MSC) server, wherein the second Handover Request comprises an international mobile subscriber identity (IMSI) and first information for determining a source serving General Packet Radio Service (GPRS) support node (SGSN), and the second Handover Request is a request sent by the MSC server according to a first Handover Request from one of a base station controller (BSC) and a radio network controller (RNC), wherein the first Handover Request is a message for requesting a handover sent by one of the BSC and RNC when the PS LTE/HSPA network supports a PS handover and a CS handover, and a user equipment (UE) is in a dual transfer mode, and no other message for requesting a handover is sent by one of the BSC and the RNC;
   determining the source SGSN according to the first information;
   sending a Context Request message comprising the IMSI to the source SGSN; and
   receiving a Context Response message sent by the source SGSN, wherein the Context Response message comprises context information of a user equipment corresponding to the IMSI;
   receiving a Handover Notify message sent by a base station; and
   sending a notification message for notifying handover completion to the source SGSN according to the Handover Notify message received by the receiver for starting a timer after receiving the notification message, if the timer expires, releasing a related PS source, and if the timer does not expire, waiting to release the related PS resource until the timer expires.

5. The method according to claim 4, wherein the first Handover Request comprises only PS handover-related information.

6. A mobile switching center (MSC) server, when a handover is carried out from a circuit switched (CS) 2G/3G network to a packet switched (PS) long term evolution (LTE)/high speed access (HSPA) network, comprising:
   a receiver, configured to receive a first Handover Request for a user equipment (UE) sent by one of a base station controller (BSC) and a radio network controller (RNC) when the PS LTE/HSPA network supports a PS handover and a CS handover, and the UE is in a dual transfer mode, wherein the first Handover Request is a message for requesting a handover sent by one of the BSC and the RNC, and no other message for requesting a handover is sent by one of the BSC and the RNC; and
   a transmitter, configured to send a second Handover Request to a target mobility management entity (MME) according to the first Handover Request received by the receiver, wherein the second Handover Request comprises an international mobile subscriber identity IMSI and first information for determining a source General Packet Radio Service (GPRS) support node SGSN, the second handover request is configured to indicate the target MME to send a Context Request message comprising the IMSI to the source SGSN and receives context information of the UE associated with the IMSI and is sent by the source SGSN;

wherein the receiver is further configured to receive a Handover Notify message sent by a base station; and wherein the transmitter is further configured to send a notification message for notifying handover completion to the source SGSN according to the Handover Notify message; wherein a timer is started by RNC when the RNC sends the first Handover Request, and after sending a notification message, if the timer expires, releasing a related PS source, and if the timer does not expire, waiting to release the related PS resource until the timer expires.

7. The MSC server according to claim 6, wherein the first Handover Request received by the receiver comprises only PS handover-related information.

8. The MSC server according to claim 6, wherein when the serving network is a high speed uplink packet access (HSPA) network, the first Handover Request received by the receiver is one of a Relocation Required message sent by the RNC, and a CS Handover Required message sent by the BSC, wherein the Relocation Required message or the CS Handover Required message comprises a source RNC to target RNC transparent container, a quantity of Iu instances in the source RNC to target RNC transparent container is set to 1, and the source RNC to target RNC transparent container comprises only PS handover-related information.

9. The MSC server according to claim 6, wherein when the serving network is a long term evolution (LTE) network, the first Handover Request received by the receiver is one of a Relocation Required message sent by the RNC, and a CS Handover Required message sent by the BSC, wherein the Relocation Required message or the CS Handover Required message comprises a source base station to target base station transparent container, and the source base station to target base station transparent container comprises only PS handover-related information.

10. A mobility management entity MME, when a handover is carried out from a circuit switched (CS) 2G/3G network to a packet switched (PS) long term evolution (LTE)/high speed access (HSPA) network, comprising:

a receiver, configured to receive a second Handover Request sent by a mobile switching center (MSC) server, wherein the second Handover Request comprises an international mobile subscriber identity (IMSI) and first information for determining a source serving General Packet Radio service (GPRS) support node (SGSN), and the second Handover Request is a request sent by the MSC server according to a first Handover Request from one of a base station controller (BSC) and a radio network controller (RNC), wherein the first Handover Request is a message for requesting a handover sent by one of the BSC and the RNC when the PS LTE/HSPA network supports a PS handover and a CS handover and a user equipment (UE) is in a dual transfer mode, and no other message for requesting a handover is sent by one of the BSC and the RNC;

a processor, configured to determine the source SGSN according to the first information comprised in the second Handover Request received by the receiver;

a transmitter, configured to send a Context Request message comprising the IMSI to the source SGSN determined by the processor; and the receiver, configured to receive a Context Response message sent by the source SGSN, wherein the Context Response message comprises context information of the UE corresponding to the IMSI;

the receiver, configured to receive a Handover Notify message sent by a base station; and the transmitter, configured to send a notification message for notifying handover completion to the source SGSN according to the Handover Notify message received by the receiver for starting a timer after receiving the notification message, if the timer expires, the releasing a related PS resource, and if the timer does not expire, waiting to release the related PS resource until the timer expires.

11. The MME according to claim 10, wherein the first Handover Request comprises only PS handover-related information.

* * * * *